(12) United States Patent
Lowe

(10) Patent No.: US 11,663,433 B2
(45) Date of Patent: May 30, 2023

(54) METAL-DOPED EPOXY RESIN TRANSACTION CARD AND PROCESS FOR MANUFACTURE

(71) Applicant: CompoSecure, LLC, Somerset, NJ (US)

(72) Inventor: Adam Lowe, Somerset, NJ (US)

(73) Assignee: COMPOSECURE, LLC, Somerset, NJ (US)

( * ) Notice: Subject to any disclaimer, the term of this patent is extended or adjusted under 35 U.S.C. 154(b) by 239 days.

(21) Appl. No.: 17/275,342

(22) PCT Filed: Sep. 11, 2019

(86) PCT No.: PCT/US2019/050592
§ 371 (c)(1),
(2) Date: Mar. 11, 2021

(87) PCT Pub. No.: WO2020/055987
PCT Pub. Date: Mar. 19, 2020

(65) Prior Publication Data
US 2022/0051064 A1    Feb. 17, 2022

Related U.S. Application Data

(60) Provisional application No. 62/730,282, filed on Sep. 12, 2018.

(51) Int. Cl.
*G06K 19/077* (2006.01)
*G06K 19/02* (2006.01)
(Continued)

(52) U.S. Cl.
CPC ............ *G06K 19/022* (2013.01); *B29C 35/02* (2013.01); *B42D 25/373* (2014.10); *B42D 25/45* (2014.10);
(Continued)

(58) Field of Classification Search
CPC ....... G06K 19/07722; G06K 19/06196; B29K 2063/00; B29K 2503/06
(Continued)

(56) References Cited

U.S. PATENT DOCUMENTS 6,362,434 B1 * 3/2002 Yoshida ............... H05K 1/0373
428/210
6,764,014 B2 * 7/2004 Lasch .................. B42D 25/328
235/487

(Continued)

FOREIGN PATENT DOCUMENTS

EP    0609071 A1    1/1994

OTHER PUBLICATIONS

International Preliminary Report on Patentability for International Application No. PCT/US2019/050592, dated Mar. 9, 2021, 9 pages.
(Continued)

*Primary Examiner* — Paultep Savusdiphol
(74) *Attorney, Agent, or Firm* — RatnerPrestia

(57) ABSTRACT

A transaction card, and processes for the manufacture thereof, having a core layer, optionally, one or more layers or coatings over the core layer, and at least one of a magnetic stripe, a machine readable code, and a payment module chip disposed in or on the card and suitable for rendering the card operable for conducting a transaction. The core layer comprises a metal-doped cured epoxy comprised of metal particles distributed in a binder consisting essentially of a cured, polymerized epoxy resin, the core comprising greater than 50%, preferably greater than 75%, and more preferably greater than 90%, of the weight and/or volume of the card. In some embodiments, the core includes a metal insert enveloped with the metal-doped curable epoxy, wherein the periphery of the epoxy extends beyond the periphery of the
(Continued)

metal insert and has material properties more conducive to cutting or punching than the metal insert.

29 Claims, 5 Drawing Sheets

(51) Int. Cl.
*B42D 25/373* (2014.01)
*B42D 25/45* (2014.01)
*B29C 35/02* (2006.01)
*G06K 19/06* (2006.01)
*B29K 63/00* (2006.01)
*B29K 503/06* (2006.01)

(52) U.S. Cl.
CPC .... *G06K 19/06196* (2013.01); *B29K 2063/00* (2013.01); *B29K 2503/06* (2013.01); *G06K 19/07722* (2013.01)

(58) Field of Classification Search
USPC .................................................. 235/488, 492
See application file for complete search history.

(56) References Cited

U.S. PATENT DOCUMENTS

| | | | |
|---|---|---|---|
| 8,807,437 B2* | 8/2014 | Reed | B42D 25/45 235/487 |
| 9,016,591 B2* | 4/2015 | Herslow | B42D 25/373 235/492 |
| 9,390,366 B1* | 7/2016 | Herslow | G06K 19/07769 |
| 10,318,859 B2* | 6/2019 | Lowe | H01Q 1/2216 |
| 10,885,419 B2 | 1/2021 | Lowe et al. | |
| 2012/0223146 A1* | 9/2012 | Reed | G06K 19/07749 235/488 |
| 2014/0138443 A1* | 5/2014 | Blum | G06K 19/07728 235/487 |
| 2014/0224881 A1* | 8/2014 | Herslow | G06K 19/022 156/182 |
| 2015/0041546 A1* | 2/2015 | Herslow | G06K 19/02 428/338 |
| 2018/0129927 A1* | 5/2018 | Herslow | B32B 9/02 |
| 2018/0186040 A1 | 7/2018 | Theile et al. | |

OTHER PUBLICATIONS

International Search Report and Written Opinion for International Application PCT/US2019/050592, dated Nov. 27, 2019, 13 pages.

* cited by examiner

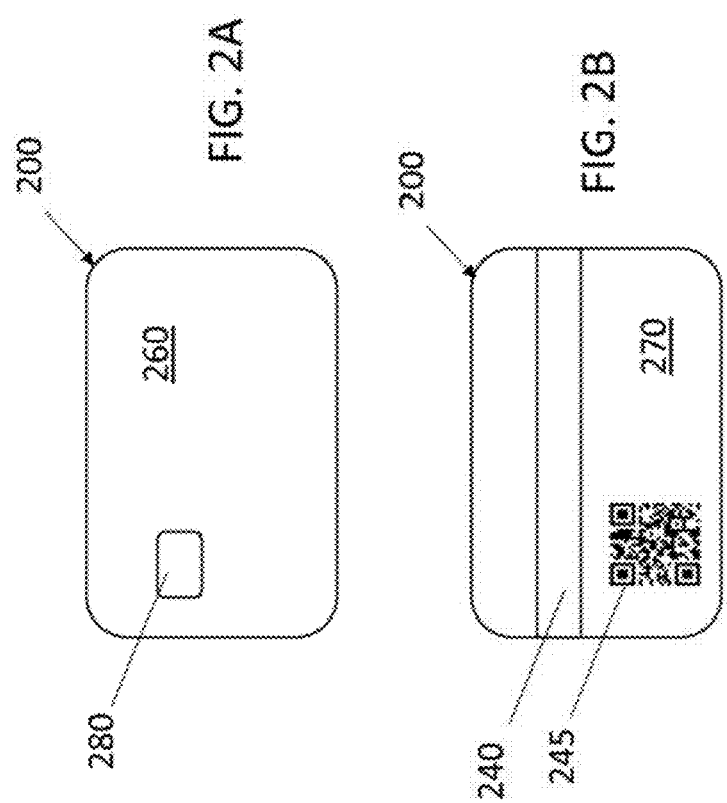

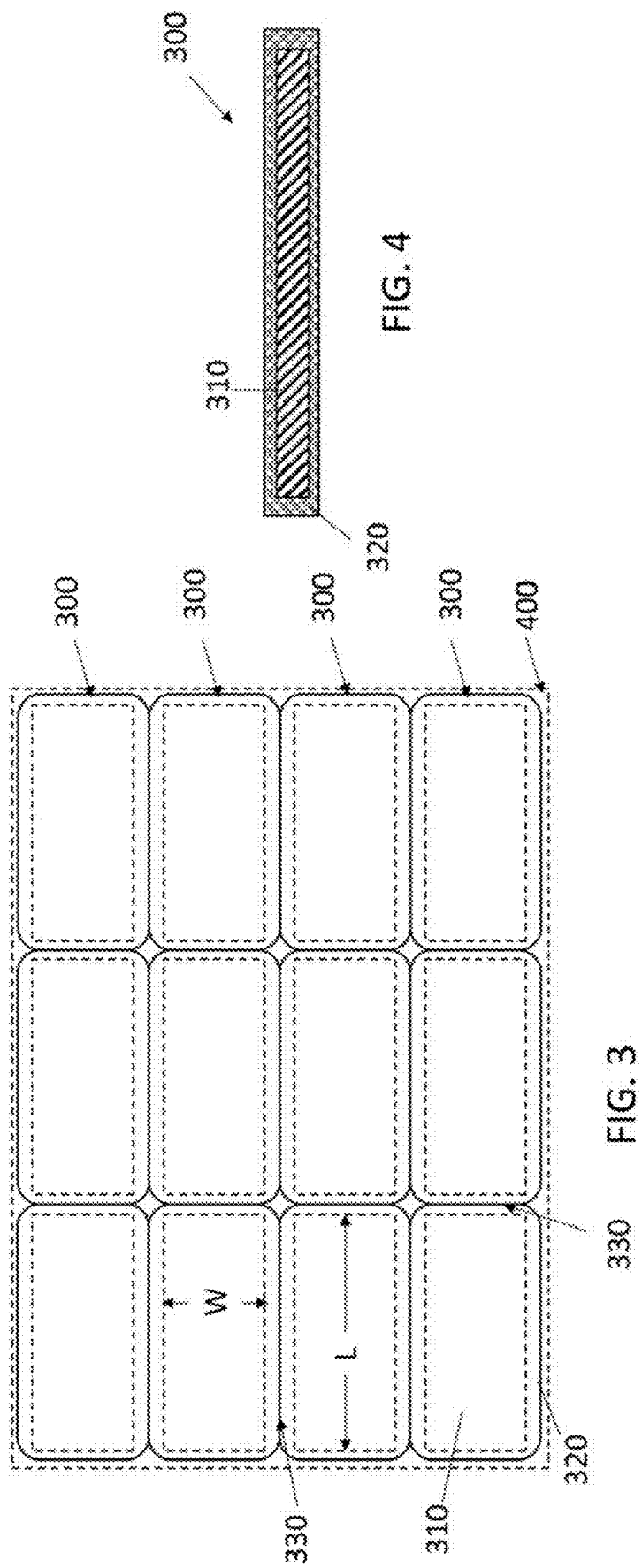

METAL-DOPED EPOXY RESIN TRANSACTION CARD AND PROCESS FOR MANUFACTURE

CROSS-REFERENCE TO RELATED APPLICATION

This application is a National Phase application of Patent Cooperation Treaty Application Number PCT/US2019/050592, filed on Sep. 11, 2019, which claims priority to U.S. Provisional Application No. 62/730,282 filed Sep. 12, 2018, the contents of all of which are incorporated herein by reference in its entirety for all purposes.

BACKGROUND OF THE INVENTION

Transaction cards made from any number of materials are known in the art. Traditionally, cards were made of plastic, such as PVC. More recently, a desire for luxury cards has led to cards comprised in part of metal. The weight and durability of metal provides an overall look and feel that is desirable.

There is desire in the art to provide materials and processes for producing transaction cards with a metallic look and feel, at a lesser cost than full metal cards, wherein the metal-like component comprises the bulk of the card.

SUMMARY OF THE INVENTION

In one aspect of the invention, a process for creating a transaction card comprises preparing a metal-doped curable epoxy comprising metal particles distributed in a binder, wherein the binder consists essentially of an uncured, unpolymerized epoxy resin; forming the metal-doped curable epoxy into a shape suitable for serving as a core for the transaction card, the core comprising greater than 50% of the weight and/or volume of a finalized card operable to conduct a transaction; curing the metal-doped curable epoxy to form a hardened core of cured metal-doped epoxy; and optionally, adding one or more layers or coatings over the hardened core. The core preferably comprises greater than 75%, and more preferably greater than 90%, of the weight and/or volume of a finalized card operable to conduct a transaction. The metal-doped curable epoxy may comprise the metal particles, the binder, and one or more additives selected from the group consisting of: colorants, hardeners, cross-linkers, chain modifiers, surfactants, curing-rate modifiers, viscosity modifiers, and fillers. The process may comprise creating one or more pockets indented in the card body, and implanting a payment module chip in at least one such pocket.

In some embodiments, the process may further comprise enveloping a metal insert with the metal-doped curable epoxy to form the core, wherein the metal insert has a first periphery and the hardened core has a second periphery extending radially outward of the first periphery such that a volume of cured metal-doped epoxy surrounds the insert. The second periphery may have material properties more conducive to cutting or punching than the first periphery. In other embodiments, the process may further comprise disposing a skeleton or scaffolding, such as a metal or plastic mesh, with the metal-doped curable epoxy to form the core. A plurality of hardened cores may be connected together in the form of a sheet, and that sheet cut into a plurality of card blanks, each card blank comprising a single core.

Another aspect of the invention is a transaction card made by any of the processes described herein.

Still another aspect of the invention is a transaction card comprising a core layer, optionally, one or more layers or coatings over the core layer, and at least one of a magnetic stripe, a machine readable code, and a payment module chip disposed in or on the card and suitable for rendering the card operable for conducting a transaction. The core layer comprises a metal-doped cured epoxy comprised of metal particles distributed in a binder consisting essentially of a cured, polymerized epoxy resin, the core comprising greater than 50% of the weight and/or volume of the card. The core layer preferably comprises greater than 75%, and more preferably greater than 90%, of the weight and/or volume of the card. The metal-doped cured epoxy core layer consists of the metal particles, the binder, and one or more additives selected from the group consisting of: colorants, hardeners, cross-linkers, chain modifiers, surfactants, curing-rate modifiers, viscosity modifiers, and fillers. In some embodiments, the core layer is opaque.

In some embodiments, the core layer further comprises a metal insert enveloped by the hardened metal-doped cured epoxy, the metal insert having a first periphery and core having a second periphery extending radially outward of the first periphery such that a volume of cured metal-doped epoxy surrounds the insert. The second periphery preferably has material properties more conducive to cutting or punching than the first periphery. In other embodiments, the core layer further comprises a skeleton or scaffolding, such as a metal or plastic mesh, embedded in the metal-doped curable epoxy.

The card may have one or more pockets in the core layer, and a payment module in at least one such pocket. The payment module preferably comprises a DI chip. Some embodiments may further comprise a booster antenna connected to, or configured to inductively couple with, an antenna in the payment module. The booster antenna may be disposed on or in the metal-doped cured epoxy core layer or may be disposed on or in a different layer than the metal-doped cured epoxy core layer.

Yet another aspect of the invention comprises an intermediate for making the card as described herein and/or in accordance with any of the processes described herein, the intermediate comprising a plurality of core layer bodies connected together in the form of a sheet. In particular, the intermediate may comprise a plurality of core layer bodies in which the core layer comprises a metal insert enveloped by the hardened metal-doped cured epoxy, the metal insert having a first periphery and each core layer body having a second periphery extending radially outward of the first periphery such that a volume of cured metal-doped epoxy surrounds the insert, in which the second periphery has material properties more conducive to cutting or punching than the first periphery.

BRIEF DESCRIPTION OF THE DRAWINGS

FIG. 2A is a plan view of the front face of an exemplary card in accordance with one embodiment of the invention.

FIG. 2B is a plan view of the back face of the exemplary card of FIG. 2A.

FIG. 2C is a longitudinal section view of the exemplary card of FIG. 2A.

FIG. 3 is a plan view of an exemplary intermediate comprising a plurality of card blanks.

FIG. 4 is a longitudinal section view of an exemplary card embodiment comprising an insert.

DETAILED DESCRIPTION OF THE INVENTION

Figure 1:
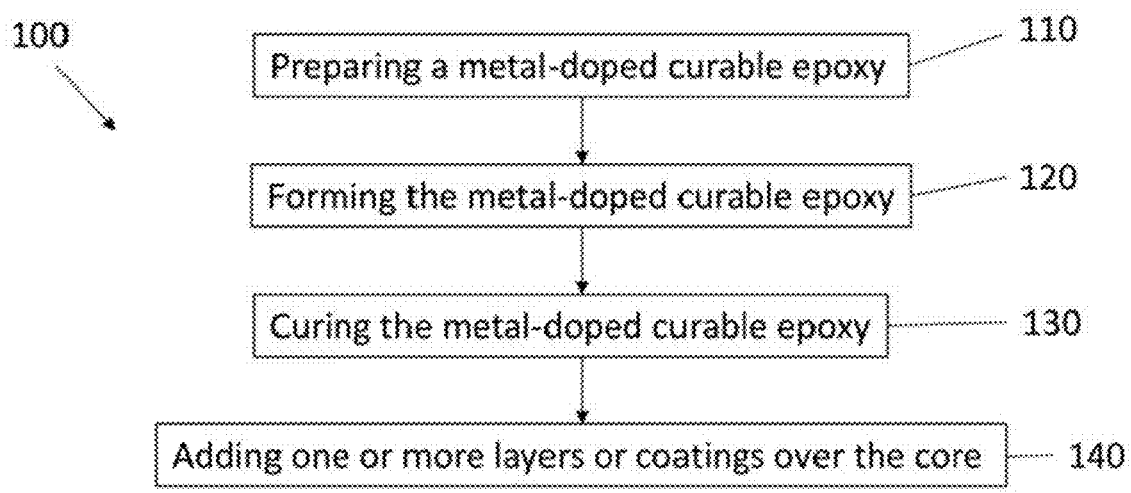
FIG. 1 is a flow chart depicting an exemplary process in accordance with one embodiment of the invention.

Referring now to the figures, FIG. 1 is a flowchart depicting an exemplary process 100 of the invention, and FIGS. 2A-2C depict an exemplary card 200 in accordance with one embodiment of the invention.

The exemplary process comprises, in step 110, preparing a metal-doped curable epoxy comprising metal particles 255 distributed in a binder 257, as is schematically depicted in FIG. 2C. While not limited to any particular type of metal particles, the particles may comprise, for example, steel (including stainless steel or mild steel), titanium, iron, lead, tungsten, brass, bronze, copper, aluminum or any alloys of the above. The binder consists essentially of an uncured, unpolymerized epoxy resin. While not limited to any particular type of epoxy, the epoxy may be, for example, a polyamide, polyamine, phenolic, novolac, aliphatic, glycidylamine, anhydride, or thiol epoxy, and may be cured by any mode, including but not limited to heat, humidity, oxidation, metal catalysis, or radiation (e.g. ultraviolet (UV) light). By "consisting essentially of," it is meant that the binder is essentially epoxy, but the mixture may comprise one or more colorants, hardeners, cross-linkers, chain modifiers, surfactants, curing-rate modifiers, viscosity modifiers, fillers, or the like. The epoxy may be clear (e.g. transparent), opaque, or any gradient therebetween (translucent), although embodiments intended to mimic a metallic feel are typically opaque with a color profile that approximates the type of metal it is intended to mimic.

Next, in step 120, the metal-doped curable epoxy is formed into a shape suitable for serving as a core for the transaction card. The core comprising greater than 50% of the weight and/or volume of a finalized card operable to conduct a transaction. Preferably, the card may comprise greater than 75%, and more preferably, greater than 90% of the weight and/or volume of the finalized card. In step 130, the metal-doped curable epoxy is cured to form an opaque hardened core 250 of cured metal-doped epoxy. Optionally, in step 140, one or more layers or coatings 260, 270 are added over the hardened core. One or more pockets 290 may be indented in the card body. Payment module 280 is embedded in pocket 290. Payment module 280 may be an integrated circuit chip configured for processing payments using contacts on the surface of the card for operation in a contact mode (i.e. per ISO 7816-2), a non-contact (e.g. radio frequency identification device (RFID)) chip embedded in the card for operation in a contactless mode (i.e. per ISO 14443), or a "dual interface" (DI) chip with both contact and non-contact features, as are well known in the art. The payment module, or any other type of electronics, may be embedded in a pocket in the card, for example as described in U.S. application Ser. No. 16/124,711, titled TRANSACTION CARD WITH EMBEDDED ELECTRONIC COMPONENTS AND PROCESS FOR MANUFACTURE, filed Sep. 7, 2018, and related applications, all of which are assigned to the common assignee of the present application and are incorporated herein by reference in their entireties.

Figure 6:
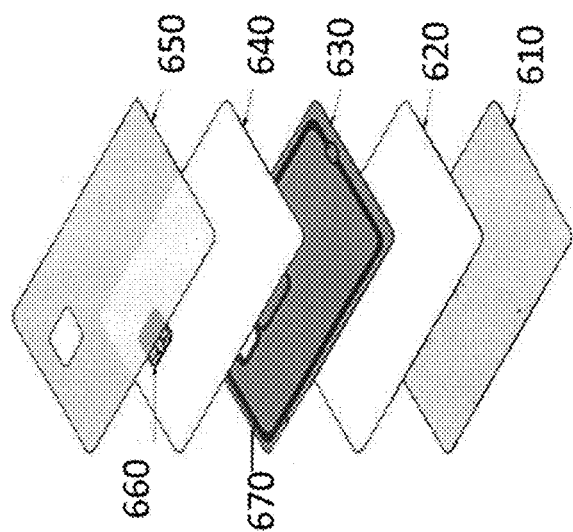
FIG. 6 is an exploded view of an exemplary card having multiple layers and a booster antenna on the metal-doped epoxy layer.

The payment module may comprise an antenna module, and the card body may further comprise a booster antenna connected to or configured for inductive coupling with the antenna module, as is known in the art. As depicted in FIG. 6, the booster antenna 670 may be integrated to the metal-doped epoxy layer 630. For example, a self-bonding insulated copper wire 670 may be ultrasonically embedded into or onto the core in forming a booster antenna with a desired number of turns. When the booster antenna is coupled with the implanted antenna module 660, the resonant frequency of the system is approximately 13.56 MHz when in an electromagnetic field generated by a reader or terminal. Although depicted in FIG. 6 with a metal-doped epoxy layer 630, upper 640 and lower 620 printed overlays, and outer anti-scratch layers 610 and 650, one or more of the foregoing layers, aside from the to the epoxy-coated metal layer, may be optional.

In one embodiment, an inductive coupling antenna made of self-bonding insulated copper wire is ultrasonically scribed into or onto the metal-doped epoxy core and routed around the perimeter of the core to form a booster antenna with a coupling section. In some embodiments, the loading of metal particles in the epoxy may not influence the inductive coupling between the coupler section of the booster antenna and the antenna connected to the antenna module. The booster antenna may be configured in accordance with any of the embodiments shown and described in U.S. Pat. No. 9,016,591, titled PLASTIC CARDS WITH HIGH DENSITY PARTICLES, assigned to the common assignee of the present invention, and incorporated herein by reference in its entirety.

Figure 7:
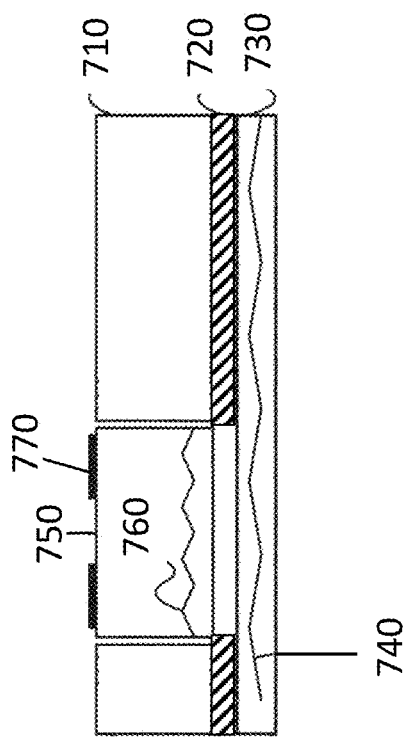
FIG. 7 is a cross-sectional view and an exemplary card with a booster antenna in a different layer than the metal-doped epoxy layer.

In other embodiments, such as is depicted in FIG. 7, the booster antenna 740 may be provided in a layer 730 separate from the metal-doped epoxy layer 710, optionally with a ferrite layer 720 disposed between the booster antenna and the metal-doped epoxy layer. For example, the arrangement between the booster antenna and the metal-doped epoxy layer may be the same as relationships shown between the booster antenna and the metal layer (with the metal-doped epoxy layer substituted for the metal layer) as shown and described in U.S. Pat. No. 9,390,366, titled METAL SMART CARD WITH DUAL INTERFACE CAPABILITY; U.S. Published App. No. 20140224881, titled DURABLE CARD, or in U.S. patent application Ser. No. 15/976,612, titled DUAL INTERFACE METAL SMART CARD WITH BOOSTER ANTENNA, all of which are assigned to the common assignee of the present invention, and all of which are incorporated herein by reference in their entireties. The antenna may comprise an etched/printed inlay of thin metal (e.g. copper or aluminum) according to standard practices in the industry. The booster antenna may be configured to be inductively coupled or directly connected to the antenna module 760 in the payment module 750, which may be a DI module also having surface contacts 770. For example, the capacitive design shown in U.S. application Ser. No. 16/124,711, may be employed.

As depicted in FIG. 2B, the finalized card may also have a magnetic strip 240 or a machine readable code (e.g. bar code, 2D-code such as a QR Code, etc.) 245 for processing payments. Other features typically found in transaction cards (not depicted) may also be included, such as user information, card number, branding, user photograph, and the like.

As depicted in FIGS. 3 and 4, in an alternate embodiment, the core may comprise a metal insert with the metal-doped curable epoxy to form the core, wherein the metal insert 310 disposed within the metal-doped epoxy 320. In such embodiments, the metal insert has a first periphery and the hardened core has a second periphery extending radially outward of the first periphery such that a volume of cured metal-doped epoxy surrounds the insert. In the process of forming such an embodiment, the metal-doped epoxy may be disposed around the insert before the curing step.

As depicted in FIG. 3, the embodiment comprising a metal insert may be formed as an intermediate in the form of a sheet 400, in which a plurality of metal inserts 310 (each having a periphery defined by dashed line 312) are disposed in the sheet with areas of the metal-doped epoxy 320 disposed between them. The regions 330 disposed between adjacent inserts 310, in which the periphery of the card 314 is defined, has material properties that are more conducive to cutting or punching than the periphery of the insert, as the metal-doped epoxy typically has a lesser shear strength than the solid metal insert. Thus, after curing the epoxy, the sheet comprises a plurality of hardened core bodies 300 connected together in sheet 400, and the manufacturing process the comprises cutting the sheet into a plurality of card blanks in which each card blank comprises a single core body. By "card blank" it means that the cards may undergo further processing thereafter, such as at least personalization for users. Although not shown in FIGS. 3 and 4, the sheets may comprise additional layers, the payment chip, magnetic stripe, and any other features of the card before cutting, or such features may be added to the blanks after the cutting step. Although shown in FIG. 3 with each insert 310 having a rectangular outline and each core 300 having a rectangular geometry with rounded corners, it should be understood that the inserts and cores are not limited to any particular geometry. It may be advantageous, however, to manufacture the cores using inserts with a rectangular shape (e.g. by cutting an extruded metal bar of width W into lengths L), than to form inserts with rounded corners having a geometry similar to (albeit slightly smaller than) core 300.

Figure 5A:
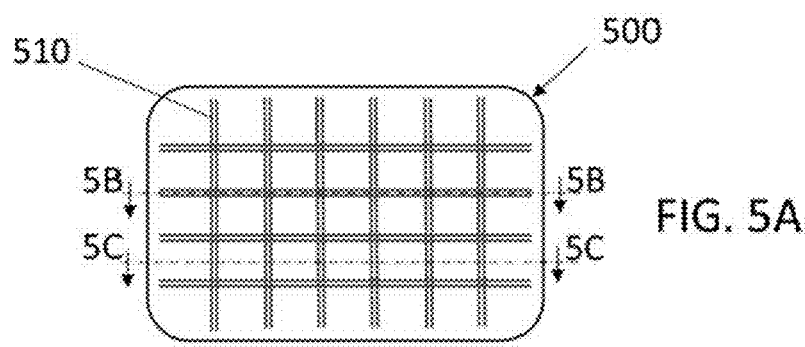
FIG. 5A is a plan view of an exemplary core embodiment comprising a reinforcing scaffold.
Figure 5B:
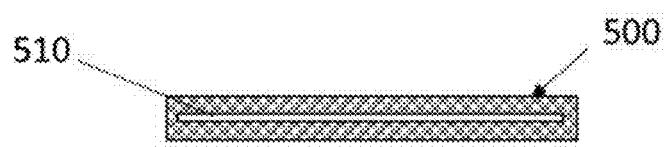
FIG. 5B is a cross-sectional view of the exemplary core of FIG. 5A as viewed from section line 5B-5B.
Figure 5C:
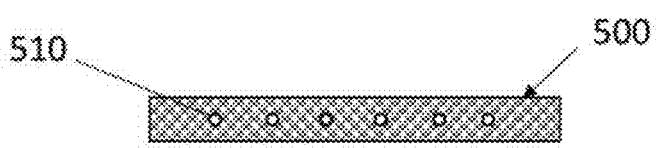
FIG. 5C is a cross-sectional view of the exemplary core of FIG. 5A as viewed from section line 5C-5C.

Optionally, as depicted in FIGS. 5A-5C, the epoxy core 500 may comprise an inner skeleton or scaffolding 510 for reinforcement. Although the scaffolding or skeleton 510 is depicted as a mesh comprised of round members 512 with square spaces 514 therebetween, the members and spaces may have any geometry and relationship to one another, and the density of spaces per unit area is not limited to that shown, but may be greater or less than as depicted. The scaffolding or skeleton 510 preferably comprises plastic or metal. The thickness of the scaffolding or skeleton 510 (and members 512 thereof) relative to the thickness of the core may be of any ratio desired. Although shown centered within and nearly extending to the periphery of the core in FIG. 5A and centered within the thickness of the core in FIGS. 5B and 5C, the scaffolding or skeleton 510 may extend to the periphery and/or may be in an uncentered relationship relative to the periphery and/or thickness. Although not depicted, the scaffolding or skeleton may be configured with one or more open areas aligned with any pockets formed or to be later cut or milled into the core.

Various disclosures, for example, U.S. Pat. Nos. 9,016,591 and 8,807,437, as well as Published Application No. US20140138443, disclose polymer cards with a metal particulate filler, wherein the metal particulate is compounded into the polymer binder. By contrast, the binder as disclosed herein consists essentially of an epoxy. As noted herein, cards comprising a core having a binder "consisting essentially of an epoxy," may still have non-binder components as part of the overall core composition, such as colorants, hardeners, cross-linkers, chain modifiers, surfactants, curing-rate modifiers, viscosity modifiers, fillers, and the like. Embodiments in which the binder consists essentially of epoxy can also be differentiated from compositions that may comprise epoxy-coated metal particles dispersed in a non-epoxy polymer binder.

Transaction cards with one or more layers comprising epoxy mixed with other materials are also know. For example, US Published Application No. 20180129927 discloses decorative layers comprising an epoxy material mixed with carbon particles or an aggregate binder material (such as epoxy) mixed with laser reactive materials such as finely divided carbon or commercially available laser-reactive additives. Transparent or translucent card embodiments, such as described in U.S. Pat. No. 6,764,014, have also been described with one or more layers comprising infrared (IR) absorbing materials, such as metallic materials or doped rare-earth materials, mixed with a binder, such as epoxy. Published EP Application No. EP0609071A discloses a magnetic stripe component of a transaction card comprising epoxy mixed with metal particles. None of the foregoing, however, disclose cards in which the bulk (e.g. greater than 50%, or preferably greater than 75%, or more preferably greater than 90%) of the card comprises a metal-doped epoxy core.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A process for creating a transaction card, the process comprising:
   (a) preparing a metal-doped curable epoxy comprising metal particles distributed in a binder, wherein the binder consists essentially of an uncured, unpolymerized epoxy resin;
   (b) forming the metal-doped curable epoxy into a shape suitable for serving as a core for the transaction card, the core comprising greater than 50% of the weight and/or volume of a finalized card operable to conduct a transaction;
   (c) curing the metal-doped curable epoxy to form a hardened core of cured metal-doped epoxy;
   (d) optionally, adding one or more layers or coatings over the hardened core.

2. The process of claim 1, wherein the core comprises greater than 75% of the weight and/or volume of a finalized card operable to conduct a transaction.

3. The process of claim 1, wherein the core comprises greater than 90% of the weight and/or volume of a finalized card operable to conduct a transaction.

4. The process of claim 1, wherein the metal-doped curable epoxy comprises the metal particles, the binder, and one or more additives selected from the group consisting of: colorants, hardeners, cross-linkers, chain modifiers, surfactants, curing-rate modifiers, viscosity modifiers, and fillers.

5. The process of claim 1, further comprising in step (b), enveloping a metal insert with the metal-doped curable epoxy to form the core, wherein the metal insert has a first periphery and the hardened core has a second periphery extending radially outward of the first periphery such that a volume of cured metal-doped epoxy surrounds the metal insert.

6. The process of claim 5, wherein the second periphery has material properties more conducive to cutting or punching than the first periphery.

7. The process of claim 1, further comprising in step (b), disposing a skeleton or scaffolding with the metal-doped curable epoxy to form the core.

8. The process of claim 7, wherein the skeleton or scaffolding comprises a metal or plastic mesh.

9. The process of claim 1, comprising creating a plurality of hardened cores connected together in the form of a sheet, the process further comprising cutting the sheet into a plurality of card blanks, each card blank comprising a single core.

10. The process of claim 1, further comprising creating one or more pockets indented in the core.

11. The process of claim 10, further comprising implanting a payment module chip in at least one pocket of the one or more pockets.

12. A transaction card product made by the process of claim 1.

13. A transaction card comprising:
a core layer comprising a metal-doped cured epoxy comprised of metal particles distributed in a binder consisting essentially of an cured, polymerized epoxy resin, the core comprising greater than 50% of the weight and/or volume of the card;
optionally, one or more layers or coatings over the core layer;
at least one of: a magnetic stripe, a machine readable code, and a payment module chip disposed in or on the card and suitable for rendering the card operable for conducting a transaction.

14. The card of claim 13, wherein the core layer comprises greater than 75% of the weight and/or volume of the card.

15. The card of claim 13, wherein the core layer comprises greater than 90% of the weight and/or volume of the card.

16. The card of claim 13, wherein the metal-doped cured epoxy core layer comprises the metal particles, the binder, and one or more additives selected from the group consisting of: colorants, hardeners, cross-linkers, chain modifiers, surfactants, curing-rate modifiers, viscosity modifiers, and fillers.

17. The card of claim 13, wherein the core layer further comprises a metal insert enveloped by the hardened metal-doped cured epoxy, the metal insert having a first periphery and core having a second periphery extending radially outward of the first periphery such that a volume of cured metal-doped epoxy surrounds the metal insert.

18. The card of claim 17, wherein the second periphery has material properties more conducive to cutting or punching than the first periphery.

19. The card of claim 13, wherein the core layer further comprises a skeleton or scaffolding embedded in the metal-doped curable epoxy.

20. The card of claim 19, wherein the skeleton or scaffolding comprises a metal or plastic mesh.

21. The card of claim 13, further comprising one or more pockets in the core layer.

22. The card of claim 21, further comprising a payment module in at least one pocket of the one or more pockets.

23. The card of claim 22, wherein the payment module comprises a DI chip.

24. The card of claim 22, further comprising a booster antenna connected to, or configured to inductively couple with, an antenna in the payment module.

25. The card of claim 24, wherein the booster antenna is disposed on or in the metal-doped cured epoxy core layer.

26. The card of claim 24, wherein the booster antenna is disposed on or in a different layer than the metal-doped cured epoxy core layer.

27. The card of claim 13, wherein the core layer is opaque.

28. An intermediate for making the card of claim 13, the intermediate comprising a plurality of core layer bodies connected together in the form of a sheet.

29. The intermediate of claim 28, wherein the sheet comprises a plurality of core layer bodies in which the core layer comprises a metal insert enveloped by the hardened metal-doped cured epoxy, the metal insert having a first periphery and each core layer body having a second periphery extending radially outward of the first periphery such that a volume of cured metal-doped epoxy surrounds the metal insert, wherein the second periphery has material properties more conducive to cutting or punching than the first periphery.

* * * * *